United States Patent
Kim et al.

(10) Patent No.: US 9,857,616 B2
(45) Date of Patent: Jan. 2, 2018

(54) TOUCH SENSING OPTICAL SYSTEM AND DISPLAY DEVICE INCLUDING THE SAME

(71) Applicant: SAMSUNG DISPLAY CO., LTD., Yongin-si, Gyeonggi-do (KR)

(72) Inventors: Kang-Min Kim, Hwaseong-si (KR); Seon Ki Kim, Yongin-si (KR); Tae Hyung Kim, Anyang-si (KR); Jeong Min Sung, Seoul (KR); Hyung Woo Yim, Goyang-si (KR); Jin Oh Song, Seoul (KR); Hae Young Yun, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 157 days.

(21) Appl. No.: 14/828,474

(22) Filed: Aug. 17, 2015

(65) Prior Publication Data
US 2016/0077368 A1 Mar. 17, 2016

(30) Foreign Application Priority Data
Sep. 12, 2014 (KR) ........................ 10-2014-0121319

(51) Int. Cl.
*G06F 3/041* (2006.01)
*G02F 1/1333* (2006.01)
(Continued)

(52) U.S. Cl.
CPC ......... *G02F 1/13338* (2013.01); *G02B 27/26* (2013.01); *G02F 1/1337* (2013.01);
(Continued)

(58) Field of Classification Search
None
See application file for complete search history.

(56) References Cited

U.S. PATENT DOCUMENTS 6,975,345 B1 12/2005 Lipton et al.
7,859,521 B2 12/2010 Hotelling et al.
(Continued)

FOREIGN PATENT DOCUMENTS

CN 101825966 A 9/2010
CN 201611416 U 10/2010
(Continued)

OTHER PUBLICATIONS

AU 2010207973 A1 (Abstract Only), see English counterpart WO 2010/088666 A1.
(Continued)

*Primary Examiner* — Seokyun Moon
(74) *Attorney, Agent, or Firm* — Lewis Roca Rothgerber Christie LLP

(57) ABSTRACT

An optical system includes: a first panel including a plurality of first electrodes extending in a first direction; a second panel facing the first panel and including a plurality of second electrodes extending in a second direction crossing the first direction; an optical conversion layer between the first panel and the second panel; and a first insulating layer between the first electrodes and the second electrodes, the first insulating layer including an organic material, wherein, in a touch mode, one or more of the first electrodes and one or more of the second electrodes crossing each other form a touch sensing capacitor, and wherein, in a multi-view mode, the first electrodes and the second electrodes apply an electric field to the optical conversion layer, the electric field depending on a voltage difference between the first electrode and the second electrode, to generate different phase differences.

20 Claims, 18 Drawing Sheets

(51) Int. Cl.
*G06F 3/044* (2006.01)
*H04N 13/04* (2006.01)
*G02B 27/26* (2006.01)
*G02F 1/1335* (2006.01)
*G02F 1/1337* (2006.01)
*G02F 1/137* (2006.01)
*G02F 1/1343* (2006.01)

(52) U.S. Cl.
CPC .... *G02F 1/13731* (2013.01); *G02F 1/133528* (2013.01); *G02F 1/134309* (2013.01); *G06F 3/044* (2013.01); *G06F 3/0412* (2013.01); *H04N 13/0404* (2013.01); *G06F 2203/04111* (2013.01)

(56) References Cited

U.S. PATENT DOCUMENTS

| | | | |
|---|---|---|---|
| 7,995,041 | B2 | 8/2011 | Chang |
| 8,217,913 | B2 | 7/2012 | Hotelling et al. |
| 8,243,027 | B2 | 8/2012 | Hotelling et al. |
| 2010/0194699 | A1 | 8/2010 | Chang |
| 2011/0045537 | A1 | 2/2011 | Welcher et al. |
| 2011/0096251 | A1 | 4/2011 | Son et al. |
| 2011/0109622 | A1 | 5/2011 | Son et al. |
| 2011/0228181 | A1 | 9/2011 | Jeong et al. |
| 2012/0081330 | A1 | 4/2012 | Park et al. |
| 2012/0162550 | A1 | 6/2012 | Jeong et al. |
| 2012/0229421 | A1* | 9/2012 | Kim ............. G06F 3/0412 345/174 |
| 2012/0242615 | A1 | 9/2012 | Teraguchi et al. |
| 2012/0249506 | A1 | 10/2012 | Jeong et al. |
| 2012/0293452 | A1 | 11/2012 | Tun et al. |
| 2012/0293490 | A1 | 11/2012 | Yang et al. |
| 2012/0300042 | A1 | 11/2012 | Yun et al. |
| 2013/0082977 | A1 | 4/2013 | Noguchi et al. |
| 2013/0107174 | A1 | 5/2013 | Yun et al. |
| 2013/0215076 | A1 | 8/2013 | Lee et al. |
| 2013/0271388 | A1 | 10/2013 | Chu et al. |
| 2013/0300705 | A1 | 11/2013 | Goo et al. |
| 2013/0308067 | A1 | 11/2013 | Hashimoto |
| 2013/0335374 | A1 | 12/2013 | Sugita et al. |
| 2014/0028594 | A1 | 1/2014 | Chen et al. |
| 2014/0111470 | A1 | 4/2014 | Wu et al. |
| 2014/0327652 | A1* | 11/2014 | Murase ............. G06F 3/044 345/174 |
| 2015/0205406 | A1* | 7/2015 | Zhou ............. G06F 3/0412 345/174 |

FOREIGN PATENT DOCUMENTS

| | | |
|---|---|---|
| CN | 102231032 A | 11/2011 |
| CN | 102231032 A1 * | 11/2011 |
| CN | 102262478 A | 11/2011 |
| CN | 102341774 A | 2/2012 |
| EP | 2 214 084 A1 | 8/2010 |
| IL | 214290 | 9/2011 |
| JP | 4741026 B2 | 5/2011 |
| JP | 2011-197685 A | 10/2011 |
| KR | 10-2010-0075301 A | 7/2010 |
| KR | 10-2010-0111082 A | 10/2010 |
| KR | 10-2010-0122661 A | 11/2010 |
| KR | 10-2011-0027538 A | 3/2011 |
| KR | 10-2011-0122726 A | 11/2011 |
| KR | 10-2011-0122727 A | 11/2011 |
| TW | 201031961 A1 | 9/2010 |
| WO | WO 2010/088666 A1 | 8/2010 |
| WO | WO 2010/088670 A1 | 8/2010 |
| WO | WO 2014/038160 A1 | 3/2014 |

OTHER PUBLICATIONS

Ching-Lung, Li et al., "Integrated 3D System with Multi-touch", IDW/AD 2012, pp. 725-728.
EP 2391933 A1 (Abstract Only), see English counterpart WO 2010/088670 A1.
Sugita, Yasuhiro et al., "In-Cell Projected Capacitive Touch Panel Technology", IDW/AD 2012, pp. 825-828.
"Transmissive 10.1 cm (4.0-Type) qHD Color LCD Module with Touch Panel Functionality Using "Pixel Eyes" Technology", 2 pages.
Website: http://www.masterimage3d.com/mobile/3d-technology, printed Aug. 13, 2015, 4 pages.
EPO Search Report dated Jan. 22, 2016, for corresponding European Patent application 15185094.8, (9 pages).

* cited by examiner

Multi-viewing point mode

Touch mode

TOUCH SENSING OPTICAL SYSTEM AND DISPLAY DEVICE INCLUDING THE SAME

CROSS-REFERENCE TO RELATED APPLICATION

This application claims priority to and the benefit of Korean Patent Application No. 10-2014-0121319, filed in the Korean Intellectual Property Office on Sep. 12, 2014, the entire content of which is incorporated herein by reference.

BACKGROUND

1. Field

Aspects of embodiments of the present invention relate to an optical system and a display device including the same.

2. Description of the Related Art

Recently, display devices capable of displaying 3-dimensional (3D) images or presenting different images to respective users (e.g., viewers) at different positions (multi-viewing) have attracted attention.

Generally, in a 3D image display device, stereoscopic perception of a displayed object is represented by using a binocular parallax effect to create stereoscopic perception at a near distance. For example, when different 2-dimensional (2D) images are presented to a left eye and a right eye, respectively, and the image presented to the left eye (hereinafter referred to as a "left eye image") and the image presented to the right eye (hereinafter referred to as a "right eye image") are transferred to a viewer's brain, the left eye image and the right eye image are combined in the viewer's brain to be recognized as the 3D image having depth or stereoscopic perception (e.g., giving a viewer perceived depth perception of a displayed image).

The 3D image display device capable of displaying the 3D image may use the binocular parallax effect and may display a stereoscopic 3D image by using glasses, such as shutter glasses, polarized glasses, or the like, or may be an autostereoscopic 3D image display device in which an optical system, such as a lenticular lens, a parallax barrier, or the like, is disposed on a display device and displays a 3D image without using glasses.

A multi-viewing display technique may use a similar method to the 3D image display technique to present the different images to the observers at different positions.

The autostereoscopic 3D image display device and/or the multi-viewing display device using a lens display images corresponding to different viewing points and changes a light path of the image by using the lens positioned between the display panel and the observer to divide the 3D image or the multi-viewing image into the several viewpoints to be displayed and transmit the respective images to each viewing point, thereby realizing the 3D image or the multi-viewing image. The autostereoscopic 3D image/multi-viewing display device using the lens may display an image having higher luminance compared with the display device using a barrier.

The display device may also include a touch sensing function capable of user interaction corresponding to the displayed image. The touch sensing function is used to create touch information, such as whether or not an object approaches or touches a screen and a touch location thereof, by sensing changes in pressure, charges (e.g., electrical charges or current), light, and the like which are applied to a screen of the display device when the user approaches or touches the screen using a finger or a touch pen, for example, to write text or draw figures. The display device may receive an image signal based on the touch information.

The touch sensing function may be implemented by a sensor. The sensor may be classified into various types, such as a resistive type, a capacitive type, an electro-magnetic (EM) type, and/or an optical type.

Among these, the capacitive type sensor includes a sensing capacitor and detects a change in capacitance of the sensing capacitor which is generated when a conductor, such as a finger, approaches the sensor to determine whether or not the conductor is in contact with the sensor and a corresponding contact position.

The capacitive type touch sensing sensor includes a sensing capacitor including a plurality of sensing electrodes transmitting a detection signal and detects a change in the capacitance of the sensing capacitor generated when the conductor, such as the finger, approaches the touch sensing sensor, thereby determining whether or not the conductor is in contact with the sensor and the corresponding contact position.

The above information disclosed in this Background section is only for enhancement of understanding of the background of the invention, and therefore, it may contain information that does not form the prior art that is already known to a person of ordinary skill in the art.

SUMMARY

A display device having both a 3D image display function and a touch sensing function is desirable. If an optical system, such as a lens, to display the 3D image or the multi-viewing image and a separate sensor having the touch sensing function are attached to the display device, the thickness and the weight of the entire display device may be increased and/or the brightness of a displayed image may be reduced such that competitiveness or desirability of a product may be decreased. Also, the optical system and the sensor may be formed using a more complicated process including a number of masks and increased processing time, resulting in increased manufacturing cost.

Accordingly, aspects of embodiments of the present invention provide an optical system reducing the drawbacks that decrease the competitiveness of the product, such as increased thickness, increased weight, increased number of processing steps, increased processing time, and increased processing cost without a reduction in luminance of an image while having the touch sensing function and the multi-viewing point image display function, such as the 3D image and the multi-viewing image, and a display device including the same.

An optical system according to an exemplary embodiment of the present invention includes: a first panel including a plurality of first electrodes extending in a first direction; a second panel facing the first panel and including a plurality of second electrodes extending in a second direction crossing the first direction; an optical conversion layer between the first panel and the second panel; and a first insulating layer between the first electrodes and the second electrodes, the first insulating layer including an organic material, wherein, in a touch mode, one or more of the first electrodes and one or more of the second electrodes crossing each other form a touch sensing capacitor to sense a touch, and wherein, in a multi-view mode, the first electrodes and the second electrodes are configured to apply an electric field to the optical conversion layer, the electric field depending on a voltage difference between the first electrode and the second electrode, to generate different phase differences according to positions along the optical system.

According to an exemplary embodiment of the present invention, a display device includes: a display panel; an optical system facing the display panel; and a graphics controller configured to control the display panel and the optical system. The optical system includes: a first panel including a plurality of first electrodes extending in a first direction; a second panel facing the first panel and including a plurality of second electrodes extending in a second direction crossing the first direction; an optical conversion layer between the first panel and the second panel; and a first insulating layer between the first electrode and the second electrode. In a touch mode, one or more of the first electrodes and one or more of the second electrodes crossing each other form a touch sensing capacitor to sense a touch, and, in a multi-view mode, the first electrodes and the second electrodes apply an electric field to the optical conversion layer, the electric field depending on a voltage difference between the first electrode and the second electrode, to generate different phase differences according to positions along the optical system. The first insulating layer may substantially completely overlap or cover the plurality of first electrodes or/and the plurality of second electrodes in an area corresponding to a display area of the display panel.

A dielectric constant of the first insulating layer may be between about 2.5 and about 3.5, and, in the touch mode, the first insulating layer may function as a dielectric material of the touch sensing capacitor and may include an organic material.

A thickness of the first insulating layer may be greater than a thickness of the optical conversion layer.

The first insulating layer may be between the first electrodes and the optical conversion layer.

The optical conversion layer may be a liquid crystal layer.

The optical system may include a first driver configured to apply a common voltage to the plurality of first electrode in the multi-view mode and to apply a touch input voltage to the plurality of first electrodes in the touch mode, and a second driver configured to apply different voltages to the adjacent ones of the second electrodes in the multi-view mode and to receive a touch output voltage from the second electrode in the touch mode.

The plurality of first electrodes may be sequentially supplied with the touch input voltage in the touch mode.

The optical system may further include at least one alignment layer disposed on at least one of an inner surface of the first panel and an inner surface of the second panel, respectively.

The optical system may further include a cover window on the second panel, and a polarizer disposed between the cover window and the second electrodes, and the cover window may be tempered.

The second panel may further include a polarizer between the cover window and the second electrodes.

The second panel may further include a tempered substrate or a polarizer.

The first direction and the second direction may form an obtuse angle.

The display device may further include an optical system controller configured to receive a mode selection signal from the graphics controller to control the optical system and a display controller configured to receive the mode selection signal from the graphics controller.

According to exemplary embodiments of the present invention, the optical system having the touch sensing function and the 3D image or the multi-viewing image display function and the display device including the same are provided such that drawbacks, such as the thickness, the weight, the number of processing steps, the processing time, and the processing cost of such a display device may be reduced, and the luminance of the image is not substantially reduced.

DETAILED DESCRIPTION

Figure 1:
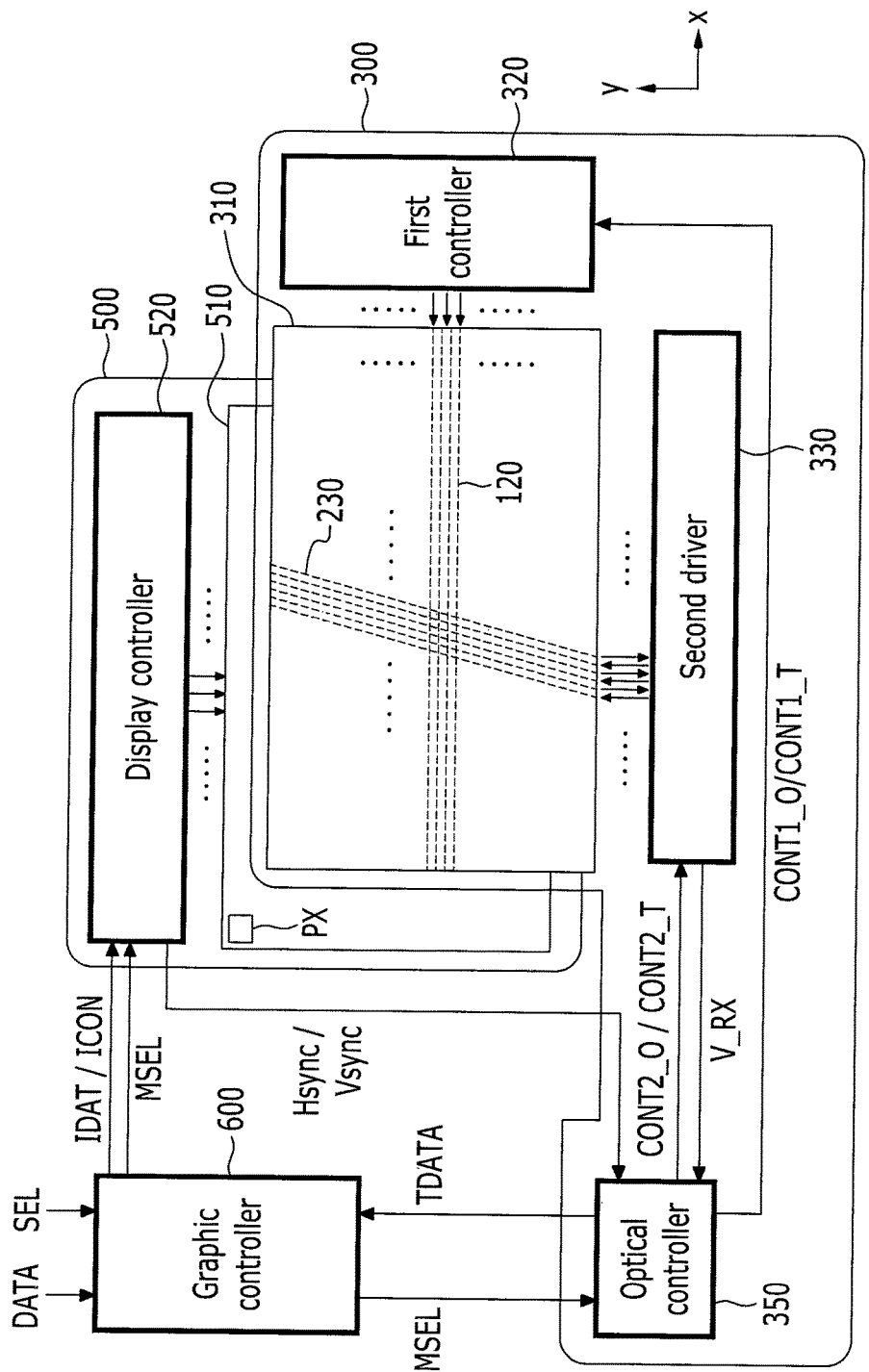
FIG. 1 is a block diagram of a display device including an optical system according to an exemplary embodiment of the present invention.

The present invention will be described more fully hereinafter with reference to the accompanying drawings, in which exemplary embodiments of the invention are shown. As those skilled in the art would realize, the described embodiments may be modified in various, different ways, all without departing from the spirit or scope of the present invention.

In the drawings, the thickness of layers, films, panels, regions, etc., may be exaggerated for clarity. Like reference numerals designate like elements throughout the specification. It will be understood that when an element, such as a layer, film, region, or substrate, is referred to as being "on," another element, it can be directly on the other element or intervening elements may also be present. When an element is referred to as being "directly on," "directly connected to," or "directly coupled to" another element, there are no intervening elements present. Also, the term "exemplary" is intended to refer to an example or illustration.

Throughout this specification and the claims that follow, when it is described that an element is "coupled" or "connected" to another element, the element may be "directly coupled" or "directly connected" to the other element or "electrically coupled" or "electrically connected" to the other element through a third element. In addition, unless explicitly described to the contrary, the word "comprise" and "include" and variations such as "comprises," "comprising," "includes," or "including" will be understood to imply the inclusion of stated elements but not the exclusion of any other elements. The terminology used herein is for the purpose of describing particular example embodiments only and is not intended to be limiting of example embodiments. As used herein, the singular forms "a" and "an" are intended to include the plural forms as well, unless the context clearly indicates otherwise.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

Now, an optical system having a touch sensing function and a display device including the same according to exemplary embodiments of the present invention will be described with reference to the accompanying drawings.

FIG. 1 is a block diagram of a display device including an optical system according to an exemplary embodiment of the present invention, Referring to FIG. 1, a display device according to an exemplary embodiment of the present invention includes an optical system 300 having a touch sensing function, an optical system controller 350 for controlling the optical system 300, a display panel 500 for displaying an image, and a graphics controller 600 for controlling the optical system 300 and the display panel 500.

The display device according to an exemplary embodiment of the present invention may be operated in at least two different display modes.

For example, the display device according to an exemplary embodiment of the present invention may be operated in a two-dimensional (2D) image display mode for displaying a 2D image or in a multi-view mode for displaying a three-dimensional (3D) image or a multi-viewing image displaying different images to different viewing points. When the display device is operated in the 2D image display mode, the touch sensing function capable of sensing an external contact may be performed according to a touch mode selection.

First, referring to the display panel 500, the display panel 500 may be one of various suitable display panels, such as a liquid crystal panel or an organic light emitting panel. The display panel 500 may be one of various suitable flexible display panels to be foldable, bendable, rollable, stretchable, and/or compressible, or may be a rigid display panel.

The display panel 500 may include a display area 510 as a region for displaying an image and a non-display area in which an image is not displayed. The display area 510 includes a plurality of pixels PX and a plurality of signal lines coupled thereto (e.g., connected thereto). The plurality of pixels PX may be arranged in a matrix. The signal lines may include a plurality of gate lines for transmitting a gate signal and a plurality of data lines for transmitting a data voltage.

The display panel 500 may be a non-emissive display device, such as a liquid crystal display, or a self-emissive display device, such as an organic light emitting panel. When the display panel 500 is the non-emissive display device, a backlight for supplying light may be further included. Also, the display panel 500 may include at least one polarizer. When the display panel 500 is the liquid crystal panel, a liquid crystal layer operated in various suitable modes may be further included. For example, the liquid crystal panel may be operated in various suitable modes, such as a PLS (plane to line switching) mode, an IPS (in-plane switching) mode, a TN (twisted nematic) mode, an STN (super TN) mode, or a VA (vertically aligned) mode.

The display panel 500 may include a plurality of pixels PX each displaying (e.g., outputting) one of three primary colors, such as red, green, or blue (RGB), and may further include a plurality of pixels PX displaying (e.g., outputting) white color in addition to the RGB pixels.

The display panel 500 may include a display controller 520 to control and drive the display panel 500 or may be coupled to the display controller 520 through a flexible printed circuit board. When the display controller 520 is included in the display panel 500, the display controller 520 may be integrated in the display panel 500 or may be adhered to (e.g., attached to or mounted on) the display panel 500 as an IC chip.

The display controller 520 may include a gate driver for generating and transmitting gate signals to the gate lines, a data driver for generating and transmitting data voltages to the data lines, and a signal controller for controlling the drivers. When the display panel 500 includes a backlight, such as in the liquid crystal display, the display controller 520 may further include a backlight driver to switch (e.g., control) the backlight.

The display controller 520 provides the signal to the display panel 500 so as to display the 2D image by the pixels PX of the display panel 500 in the 2D image display mode or to display the image of a first viewing point through some of the pixels PX (e.g., a group of the pixels PX) of the display panel 500 and to display the image of a second viewing point different from the first viewing point through different pixels PX (e.g., a different group of the pixels PX or the other of the pixels PX) during one frame in the multi-view mode. When displaying the 3D image, the first viewing point image may be a left eye image and the second viewing point may be a right eye image.

The optical system 300 includes an optical panel 310, and a first driver (e.g., first controller) 320, and a second driver (e.g., a second controller) 330. The first driver 320 and the second driver 330 for driving the optical panel 310.

The optical panel 310 is positioned in front of (e.g., over) a surface of the display 500 on which the display panel 500 displays the image (e.g., the optical panel 310 is positioned such that the display panel 500 displays the image toward the optical panel 310). The optical panel 310 includes a plurality of first electrodes 120 extending in one direction and a plurality of second electrodes 230 extending in a different direction therefrom. For example, as shown in FIG. 1, the plurality of first electrodes 120 are extending in an approximate x-axis direction and the plurality of second electrodes 230 are extending in an approximate y-axis direction. For example, the second electrode 230 may be obliquely extended with respect to the y-axis direction.

The optical panel 310 transmits (e.g., passes) the image displayed by the display panel 500 therethrough; however, the optical panel 310 may be differently driven according to the display mode. In the 2D image display mode, the optical panel 310 may transmit (e.g., display) the image displayed by the display panel 500 as it is without a division into the various viewing points. Also, in the 2D image display mode, the optical panel 310 may be driven to sense a touch according to the touch mode selection. In the multi-view mode, the optical panel 310 creates (e.g., realizes) a different phase difference according to a position along the optical panel 310, thereby forming a plurality of lenses. Accordingly, in the multi-view mode, the optical panel 310 may divide and output the image corresponding to each viewing point of the different viewing points.

The first driver 320 may apply a voltage to the first electrodes 120. In the 2D image display mode and in the touch mode, the first driver 320 may apply a touch input voltage to the plurality of first electrodes 120 sequentially in the y-axis direction. In the multi-view mode, the first driver 320 may apply a constant voltage to all of the plurality of first electrodes 120 but is not limited thereto. In the multi-view mode, the constant voltage applied to the first electrode 120 may be a common voltage Vcom.

The second driver 330 may apply a voltage to the second electrodes 230 and may receive a touch output voltage from the second electrodes 230. In the 2D image display mode and in the touch mode, the second driver 330 may receive and process the touch output voltage according to a contact (e.g., a touch) from the plurality of second electrodes 230. In the multi-view mode, the second driver 330 may apply a voltage determined according to a position of the plurality of second electrodes 230 along the optical panel 310 to form the lens capable of changing the light path of the image displayed by the display panel 500.

The first driver 320 and the second driver 330 may be integrated with or adhered to the optical panel 310 or may be coupled to the optical panel 310 through the flexible printed circuit board.

The optical system controller 350 may be coupled to the optical system 300 to control the optical system 300. The optical system controller 350 may receive a mode selection signal MSEL from the graphics controller 600 and may control the optical system 300 based on (e.g., according to) the mode selection signal. For example, when the multi-view mode is selected, the optical system controller 350 may output a first multi-viewing point control signal CONT1_O to the first driver 320 and a second multi-viewing point control signal CONT2_O to the second driver 330. When the touch mode is selected, the optical system controller 350 may output a first touch control signal CONT1_T according to the touch mode to the first driver 320 and a second touch control signal CONT2_T to the second driver 330.

The optical system controller 350 may also receive a touch output voltage V_Rx from the second driver 330 to be processed through an ND conversion unit (e.g., an ND converter) such that digital touch data TDATA may be generated and output to the graphics controller 600. For this, the optical system controller 350 may include a memory, an ND conversion unit (e.g., an ND converter), an information process circuit (e.g., an information processor), and a low frequency pass filter.

The graphics controller 600 receives image information DATA and mode selection information SEL from the outside.

The mode selection information SEL includes information on (e.g., regarding) whether the display device is operated in the 2D image display mode and/or is operated in the touch mode or is operated in the multi-view mode in this embodiment.

The graphics controller 600 processes the image information DATA based on (e.g., according to) the image information DATA and the mode selection information SEL to generate an input image signal IDAT and an input control signal ICON for controlling the display of the input image signal IDAT (e.g., for controlling the display of an image and/or images according to the input image signal IDAT). The graphics controller 600 transmits the input image signal IDAT and the input control signal ICON to the display controller 520. The graphics controller 600 receives the touch data TDATA from the optical system controller 350 and processes the image information DATA based on the touch data TDATA to generate the input image signal IDAT.

The graphics controller 600 generates the mode selection signal MSEL according to the mode selection information SEL and outputs the mode selection signal MSEL to the optical system controller 350 and the display controller 520.

The optical system 300 is configured to be operated in synchronization with the display panel 500. For this, the optical system controller 350 may receive a vertical synchronization signal Vsync and a horizontal synchronizing signal Hsync from the display controller 520.

Next, a detailed structure of the optical panel 310 of the optical system 300 according to an exemplary embodiment of the present invention will be further described with reference to FIG. 2 to FIG. 6 as well as FIG. 1.

Figure 2:
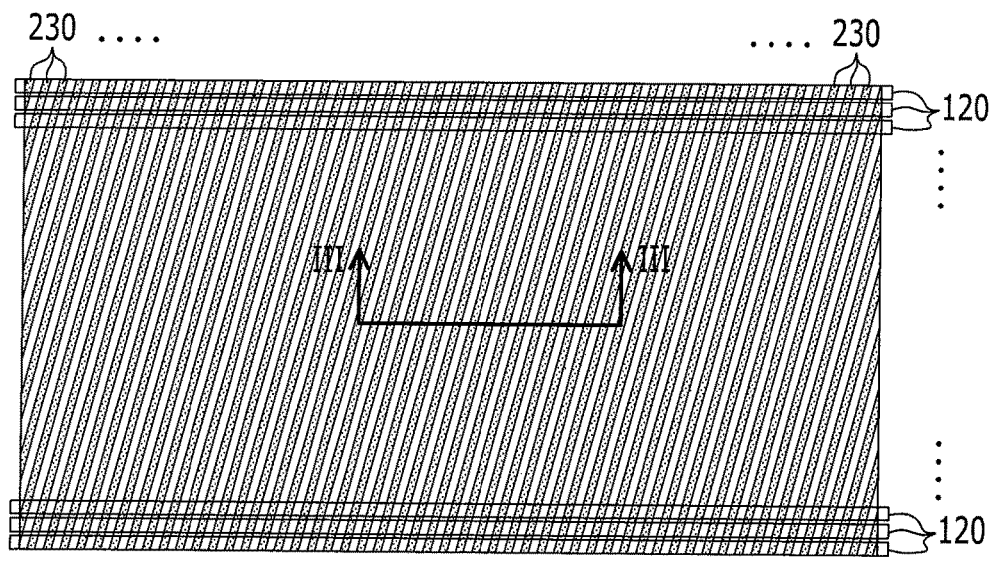
FIG. 2 is a top plan view of an optical system according to an exemplary embodiment of the present invention.

FIG. 2 is a top plan view of an optical system according to an exemplary embodiment of the present invention, and FIG. 3, FIG. 4, FIG. 5, and FIG. 6 are cross-sectional views of embodiments of an optical system taken along the line III-III of FIG. 2.

Referring to FIG. 2, the optical panel 310 according to an exemplary embodiment of the present invention, as described above, includes a plurality of first electrodes 120 arranged along one direction and a plurality of second electrodes 230 arranged in a different direction in a plan view. For example, as shown in FIG. 2, the plurality of first electrodes 120 may be approximately arranged along the y-axis direction, and the plurality of second electrodes 230 may be approximately arranged along the x-axis direction. For example, the second electrodes 230 obliquely extend with respect to the y-axis direction, thereby reducing or preventing a moire phenomenon in the display panel 500.

The first electrodes 120 may be spaced from each other (e.g., respectively separated), and a number (e.g., a predetermined number) of adjacent first electrodes 120 are electrically coupled to (e.g., electrically connected to) each other so that the electrically coupled first electrodes 120 may transmit substantially the same voltage.

Figure 3:
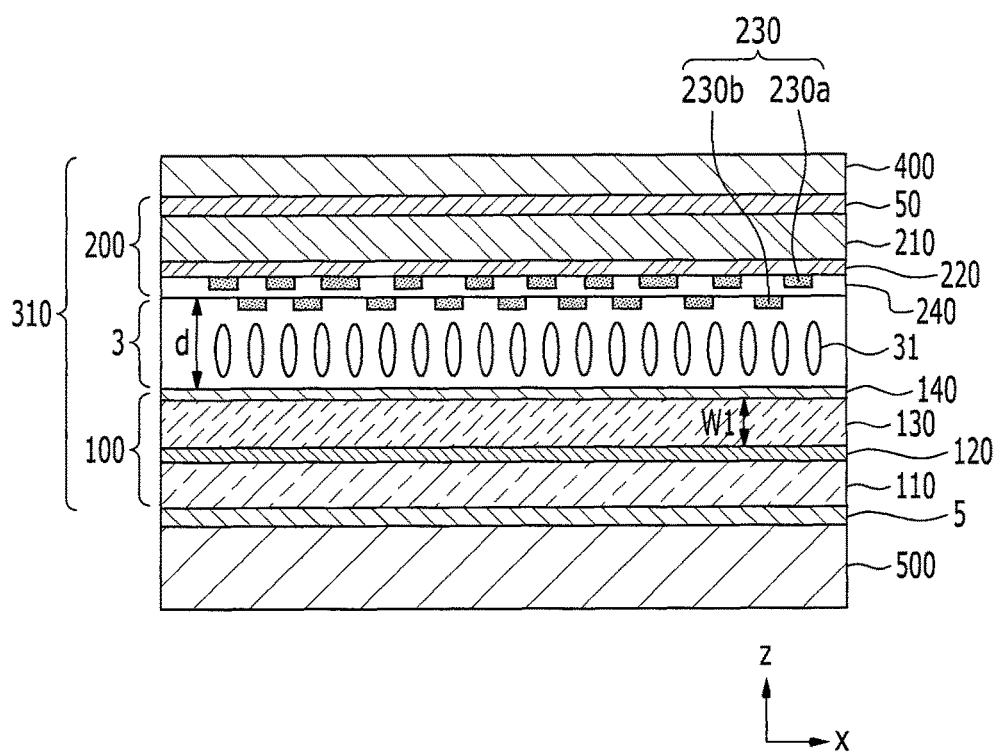
FIG. 3, FIG. 4, FIG. 5, and FIG. 6 are cross-sectional views of exemplary embodiments of the optical system taken along the line III-III of FIG. 2.

Referring to FIG. 3, the optical panel 310 according to an exemplary embodiment of the present invention may be positioned in front of (e.g., above) the surface on which the display panel 500 displays the image. The optical panel 310 may be adhered to the display panel 500 by an adhesive 5, such as an OCA (optically clear adhesive), an OCR (optically clear resin), and/or a PSA (pressure sensitive adhesive).

The optical panel 310 includes a lower panel 100 and an upper panel 200 facing each other and an optical conversion layer interposed therebetween. In the present exemplary embodiment, the optical conversion layer is a liquid crystal layer but is not limited thereto. In the present exemplary embodiment, the optical conversion layer includes (e.g., is realized by) a liquid crystal layer 3.

The lower panel 100 includes a first substrate 110. The first substrate 110 includes one or more various suitable plastic materials, such as PC, PMMA, or PET, or may include an inorganic material, such as glass or sapphire.

The plurality of first electrodes 120 are positioned on (e.g., arranged on) the first substrate 110. The first electrodes 120 may have the common voltage Vcom applied thereto when the display device is operated in the multi-view mode, or the first electrodes 120 may have the touch input voltage applied thereto when the display device is operated in the touch mode. The first electrodes 120 may be formed of a transparent conductive material, such as ITO, IZO, graphene, or a metal nanowire.

The first electrodes 120 and the second electrodes 230 of the upper panel 200 may apply an electric field to the liquid crystal layer 3. The second electrodes 230 will be further described later. The electric field includes a vertical component approximately perpendicular to (e.g., normal to) a surface of the lower panel 100 or a surface of the upper panel 200.

A first insulating layer 130 is positioned on the plurality of first electrodes 120. However, the position of the first insulating layer 130 is not limited thereto and any suitable position between the first electrode 120 and the second electrode 230 may be contemplated.

The first insulating layer 130 includes an organic insulating material.

The first insulating layer 130 functions as (e.g., acts as) a dielectric material of the touch sensing capacitor along with the liquid crystal layer 3 when in the touch mode. When in the touch mode, two terminals of the touch sensing capacitor may be one of the the first electrodes 120 and one of the second electrodes 230. When in the touch mode, the touch sensing is determined by (e.g., according to) a change of the capacitance of the touch sensing capacitor. Accordingly, decreasing the capacitance of the touch sensing capacitor may increase the sensitivity to a touch. It may be difficult to form the touch sensing capacitor having a relatively small capacitance to sense the touch by only using the relative dielectric constant and the thickness of the liquid crystal layer 3 when the liquid crystal layer 3 also functions to form the lens in the multi-view mode.

However, according to an exemplary embodiment of the present invention, by interposing the first insulating layer 130 including the organic material between the first electrode 120 and the second electrode 230, the capacitance of the touch sensing capacitor may be reduced. For example, when the optical system 300 is operated in the touch mode, the first insulating layer 130 has a relatively low dielectric constant of about 2.5 to about 3.5. A thickness W1 of the first insulating layer 130 may be greater than a cell gap d of the liquid crystal layer 3.

In an area corresponding to the display area 510, the first insulating layer 130 may overlap the first electrodes 120 and the second electrodes 230. In other words, the first insulating layer 130 may substantially completely cover and overlap the plurality of first electrodes 120 and gaps therebetween or/and substantially completely cover and overlap the plurality of second electrodes 230 and gaps therebetween In an area corresponding to the display area 510.

A first passivation layer 140 may be positioned on or over the first electrode 120. The first passivation layer 140 is positioned between the first insulating layer 130 and the liquid crystal layer 3, thereby preventing material of the first insulating layer 130 from penetrating into the liquid crystal layer 3. The first passivation layer 140 may be made of an inorganic insulating material, such as a silicon nitride ($SiN_x$) or a silicon oxide ($SiO_x$), and may have a thickness of about 1000 Å to about 2000 Å but is not limited thereto. However, if desired, the first passivation layer 140 may be omitted.

The upper panel 200 includes a second substrate 210. The second substrate 210 may include one or more various suitable plastic materials, such as PC, PMMA, and PET, or may include an inorganic material, such as glass or sapphire.

A second passivation layer 220 may be positioned on the second substrate 210. The second passivation layer 220 may be made of an inorganic insulating material, such as a silicon nitride ($SiN_x$) or a silicon oxide ($SiO_x$), and may have a thickness of about 1000 A to about 2000 A but is not limited thereto. However, if desired, the second passivation layer 220 may be omitted.

The plurality of second electrodes 230 (or a group of the plurality of second electrodes 230) are positioned on the second passivation layer 220. The second electrodes 230, as described above, may apply the electric field to the liquid crystal layer 3 along with the first electrodes 120. Accordingly, the phase difference of the liquid crystal layer 3 may be controlled and various optical elements for converting (e.g., changing) the path of the light passing therethrough, may be formed, for example, a lens may be formed. The second electrodes 230 and the first electrodes 120 form the touch sensing capacitor in the touch mode to transmit the touch output voltage according to the contact.

The second electrodes 230 may be made of a transparent conductive material, such as ITO, IZO, graphene, or metal nanowire, and may further include a low conductive material, such as a metal, to reduce wire resistance. When the second electrodes 230 further include the metal, the metal may be opaque and a portion of the second electrodes 230 made of the metal may form a minute pattern having a relatively small width.

Referring to FIG. 3, the plurality of second electrodes 230 may include a plurality of lower electrodes 230a and a plurality of upper electrodes 230b that are positioned at different layers. The lower electrodes 230a and the upper electrodes 230b may be alternately arranged along the x-axis direction.

A second insulating layer 240 is positioned between the lower electrodes 230a and the upper electrodes 230b. The second insulating layer 240 may be made of an inorganic insulating material, such as a silicon nitride ($SiN_x$) or a silicon oxide ($SiO_x$).

A width of the lower electrodes 230a and the upper electrodes 230b may vary (e.g., change) or may be constant according to their respective position along the x-axis direction.

The liquid crystal layer 3 has dielectric anisotropy and includes a plurality of liquid crystal molecules 31. The liquid crystal molecules 31 may be operated in an ECB (electrically controlled birefringence) mode, a VA (vertically aligned) mode, or an OCB (optically compensated birefringence) mode. An alignment layer may be positioned on an inner surface of the lower panel 100 and/or the upper panel 200 to align the liquid crystal molecules 31.

A polarizer 50 may be positioned on an outer surface of the upper panel 200. A transmissive axis of the polarizer 50 may be approximately parallel to the direction in which the second electrode 230 of the optical panel 310 obliquely extends with respect to the y-axis direction; however, it is not limited thereto.

The optical panel 310 may further include a cover window 400 that is positioned on the polarizer 50 and may be contacted by an external object. For instance, the cover window 400 protects the optical panel 310 from contact by an external object. The cover window 400 may be made of tempered glass, tempered sapphire, or tempered plastic. The relative dielectric constant of the cover window 400 may be greater than 7. As described above, by highly processing the relative dielectric constant of the cover window 400, the capacitance of the touch capacitor between the second electrode 230 and an external conductor (e.g., a finger) may be increased and, thereby, the touch sensitivity may be increased when the optical system 300 is operated in the touch mode.

Figure 4:
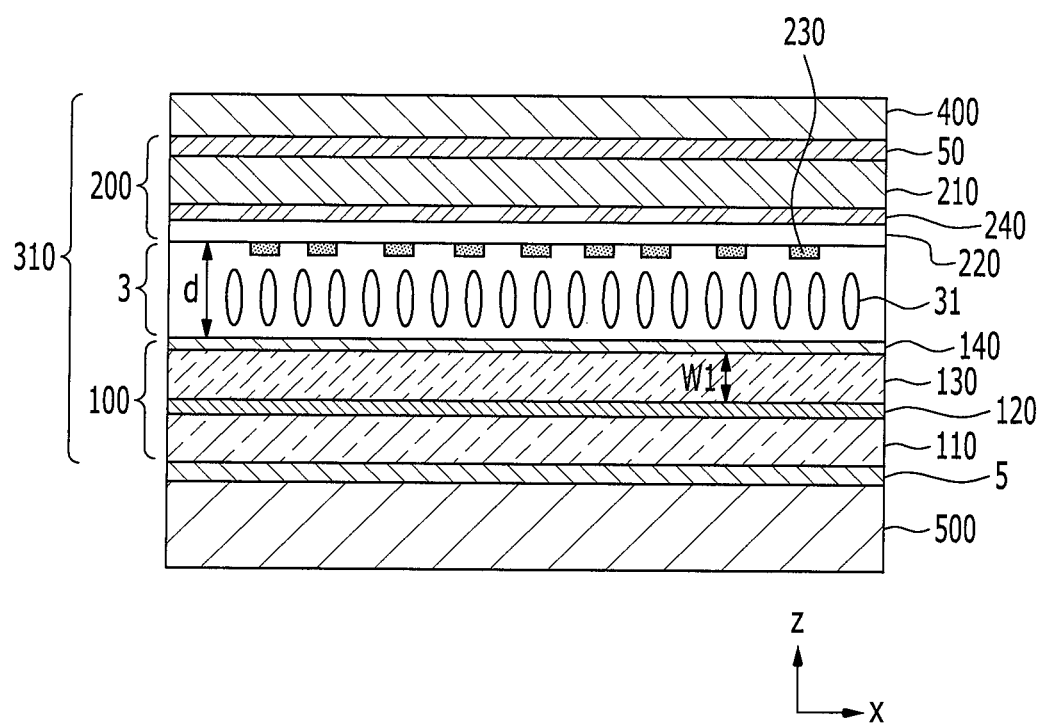

Referring to FIG. 4, many features of the optical system 300 according to the present exemplary embodiment are the same or substantially the same as the exemplary embodiment shown in FIG. 3, except for the structure of the upper panel 200. Referring to the differences from the exemplary embodiment shown in FIG. 3, the plurality of second electrodes 230 positioned on the second passivation layer 220 may be formed at (e.g., in) one single layer. The plurality of second electrodes 230 may be spaced from each other (e.g., separated from each other or arranged) along the x-axis direction and may have a constant width and/or interval along the x-axis direction or a varied width and/or interval. In the present exemplary embodiment, the second insulating layer 240 of the exemplary embodiment shown in FIG. 3 may be omitted.

Figure 5:
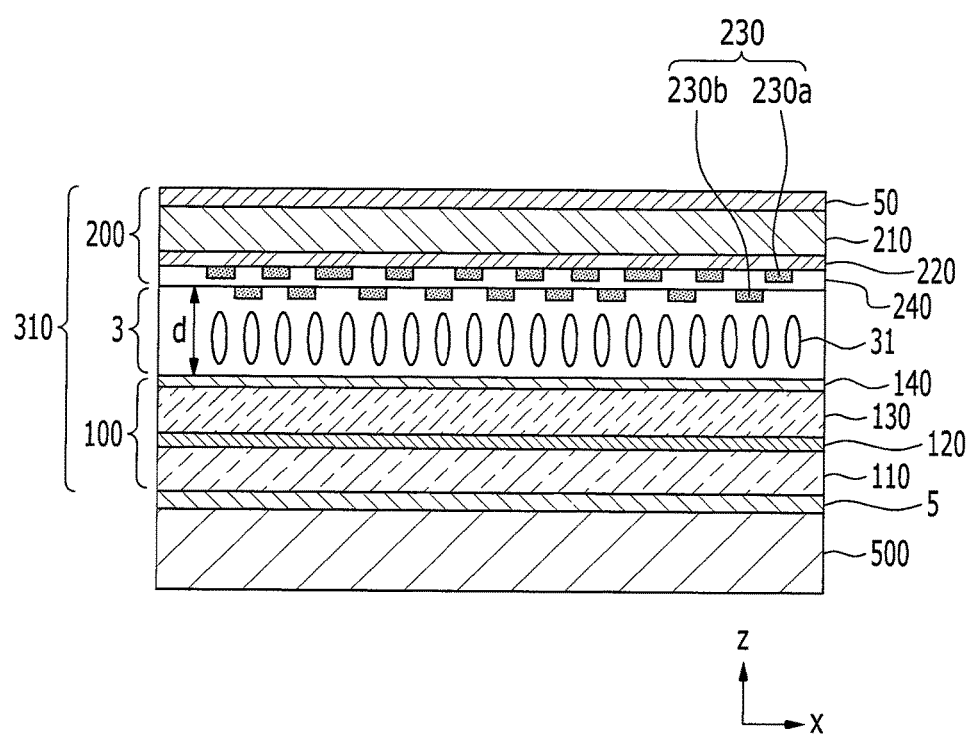

Referring to FIG. 5, many features of the optical system 300 according to the present exemplary embodiment are the same or substantially the same as the exemplary embodiment shown in FIG. 3; however, the cover window 400 may be omitted. Accordingly, the polarizer 50 positioned outermost of the optical system 300 is processed to be tempered, thereby having the high relative dielectric constant. For example, the polarizer 50 may include a PSA layer that is processed to be a hard coating. As described above, when the cover window 400 is not provided, by highly processing the relative dielectric constant of the tempered polarizer 50, the touch sensitivity may be increased when the optical system 300 is operated in the touch mode.

When omitting the cover window 400, the second substrate 210 may be processed to be tempered. That is, the second substrate 210 may be made of the tempered glass, the tempered sapphire, or the tempered plastic. In this embodiment, the polarizer 50 may be processed to be tempered or may not be processed to be tempered.

Figure 6:
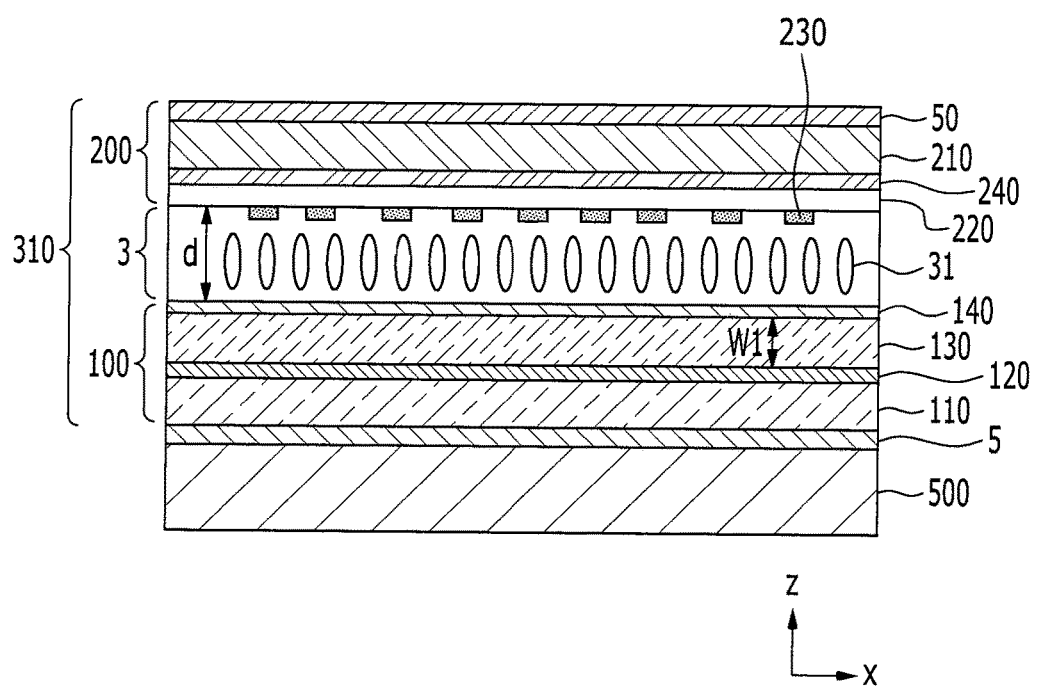

Referring to FIG. 6, many features of the optical system 300 according to the present exemplary embodiment are the same or substantially the same as the exemplary embodiment shown in FIG. 5, except for the structure of the upper panel 200. Referring to the differences from the exemplary embodiment shown in FIG. 5, a plurality of second electrodes 230 positioned on the second passivation layer 220 may be formed at (e.g., in) one single layer. The plurality of second electrodes 230 are spaced from each other (e.g., separated from each other or arranged) along the x-axis direction and may have a constant width and/or interval or a varied width and/or interval along the x-axis direction. In the present exemplary embodiment, the second insulating layer 240 of the exemplary embodiment shown in FIG. 5 may be omitted.

Next, a method in which the display device is operated in the multi-view mode according to an exemplary embodiment of the present invention will be described with reference to FIG. 7 to FIG. 15 as well as the previously described drawings.

Figure 7:
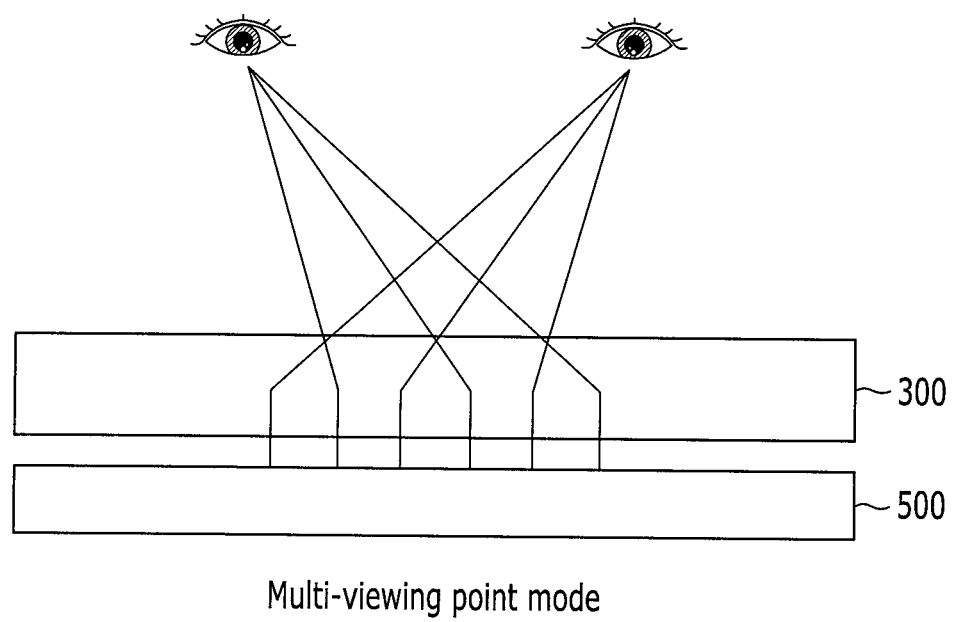
FIG. 7 is a cross-sectional view showing a schematic structure of a display device including an optical system and illustrating a method of displaying a 3D image according to an exemplary embodiment of the present invention.
Figure 8:
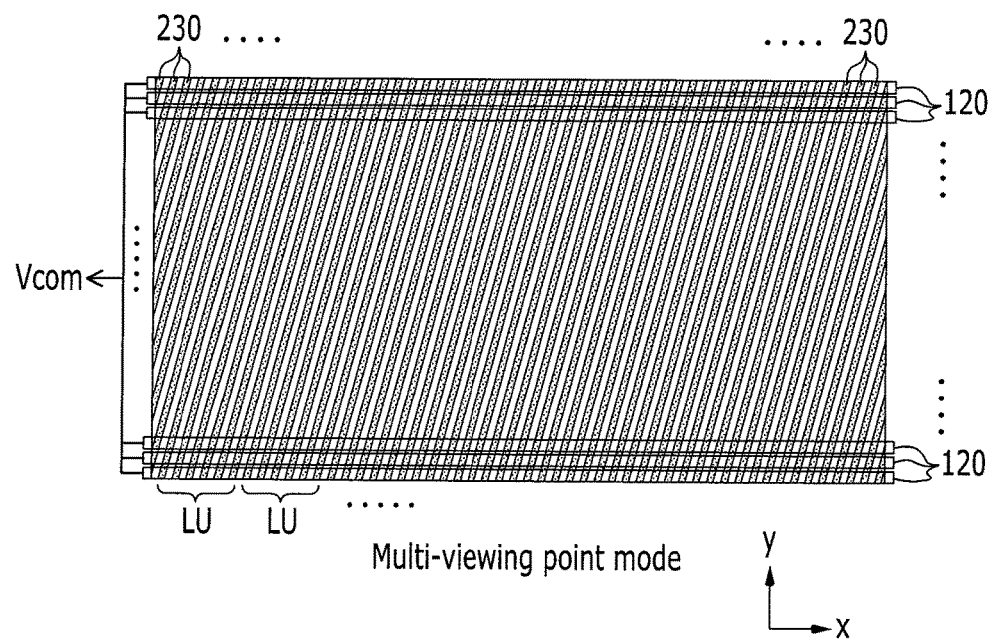
FIG. 8 is a top plan view of an optical system according to an exemplary embodiment of the present invention.
Figure 9:
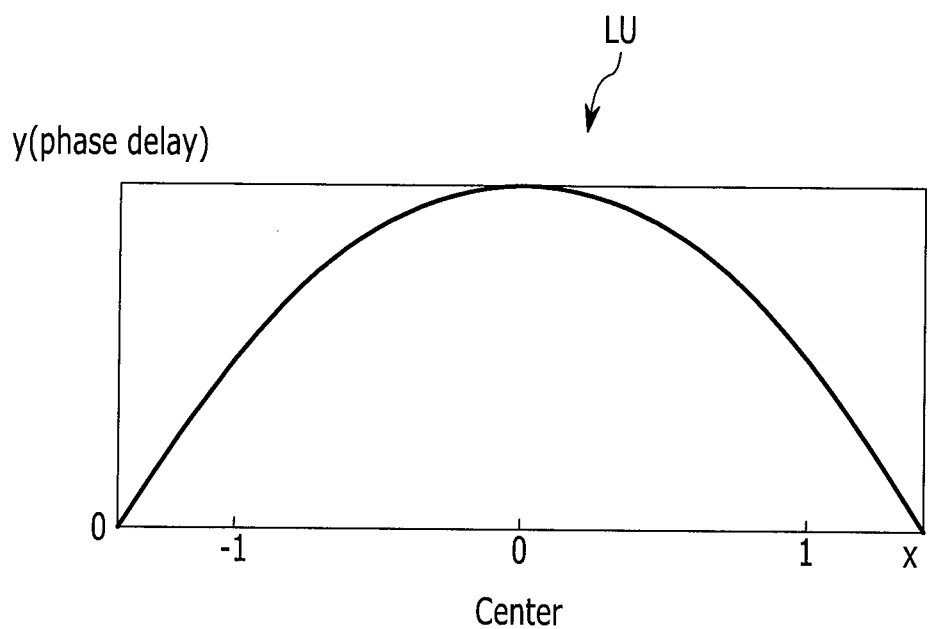
FIG. 9 to FIG. 11 are graphs showing phase delay according to a position along an optical system according to an exemplary embodiment of the present invention when the optical system forms a lens.
Figure 10:
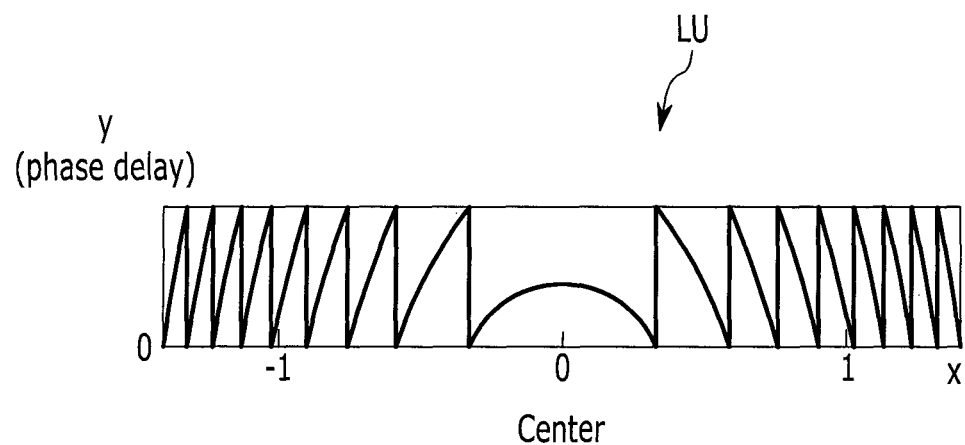
Figure 11:
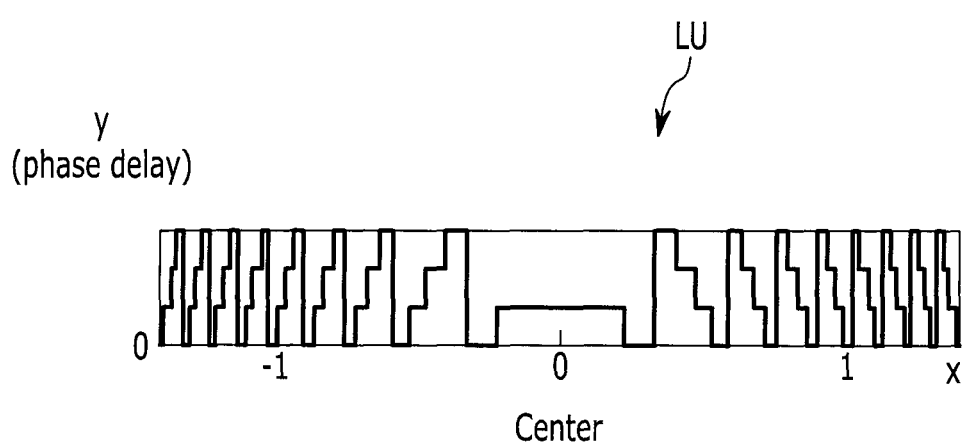
Figure 12:
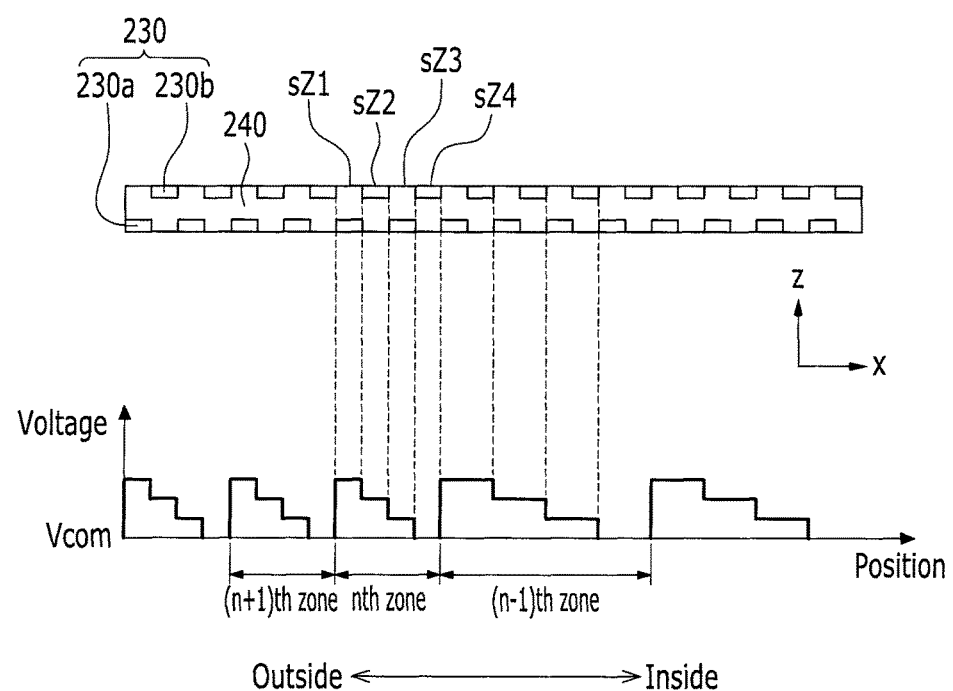
FIG. 12 is a cross-sectional view of a part (e.g., a portion) of an optical system and a voltage applied thereto according to an exemplary embodiment of the present invention.
Figure 13:
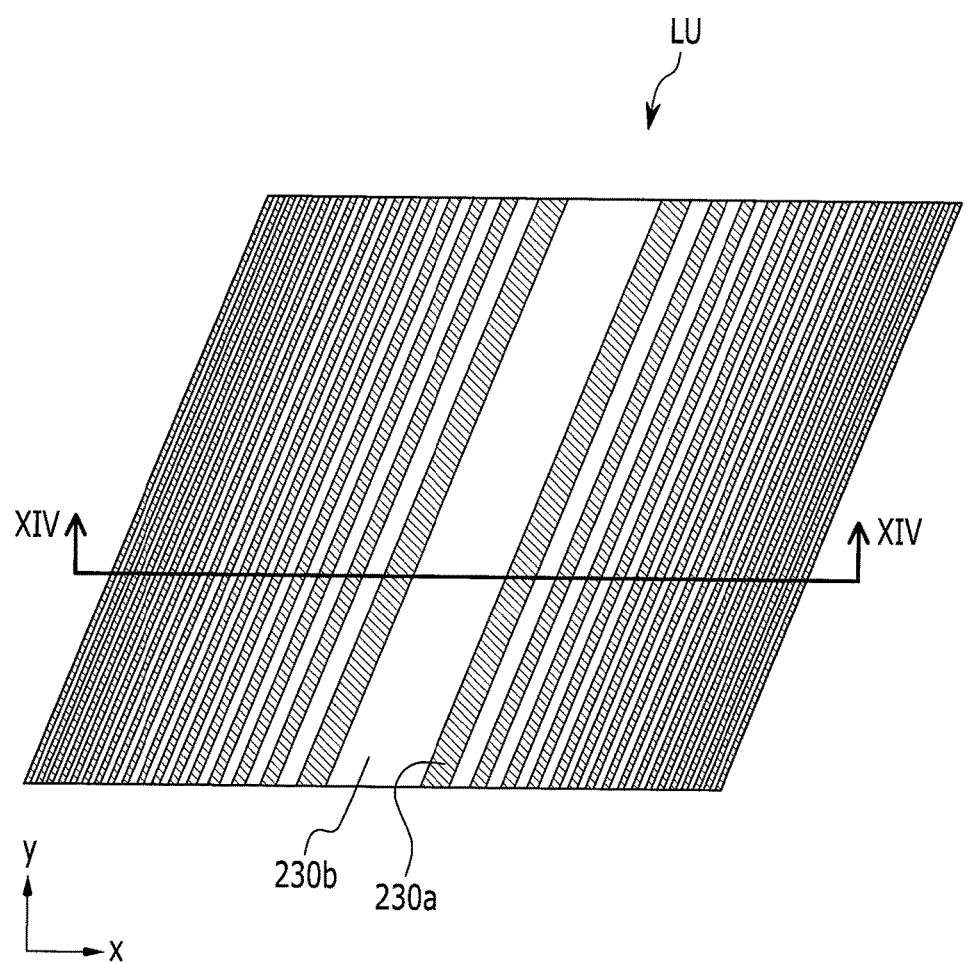
FIG. 13 is a top plan view of an optical system forming a lens unit according to an exemplary embodiment of the present invention.

FIG. 7 is a cross-sectional view showing a schematic structure of a display device including an optical system and illustrating a method of displaying a 3D image according to an exemplary embodiment of the present invention, FIG. 8 is a top plan view of an optical system according to an exemplary embodiment of the present invention, FIG. 9 to FIG. 11 are graphs showing phase delay according to a position along the optical system according to an exemplary embodiment of the present invention when the optical system forms a lens, FIG. 12 is a cross-sectional view of a part (e.g., a portion) of an optical system and a voltage applied thereto according to an exemplary embodiment of the present invention, and FIG. 13 is a top plan view of a lens unit of an optical system according to an exemplary embodiment of the present invention.

Referring to FIG. 7, the display device according to an exemplary embodiment of the present invention includes the display panel 500 and the optical system 300 at the front thereof.

When the graphics controller 600 outputs the mode selection signal MSEL selecting the multi-view mode to the optical system controller 350 and the display panel 500, the optical system controller 350, the optical system 300, and the display panel 500 are operated in the multi-view mode.

The display panel 500 divides and displays the image corresponding to the various (e.g., several different) viewing points, such as the right eye image and the left eye image, in the multi-view mode through a spatial division method. For example, a portion (e.g., a group) of a plurality of pixels of the display panel 500 may display an image corresponding to one viewing point and the remaining portion (e.g., remaining ones) thereof may display an image corresponding to a different viewing point. A number of displayed viewing points may be two or more. The plurality of different pixels displaying the image at the plurality of viewing points may be periodically arranged along any one direction.

The optical system 300 refracts the image displayed by the display panel 500 in the multi-view mode such that the respective images reach corresponding viewing points to be observed. To function as the lens of the optical system 300, a voltage is applied to the first electrodes 120 and the second electrodes 230 such that an electric field is applied to the liquid crystal layer 3. The liquid crystal molecules 31 of the liquid crystal layer 3 are rearranged by (e.g., according to) the electric field such that the liquid crystal layer 3 generates different phase delays depending on the position along the optical device 300, thereby forming the various lenses.

Referring to FIG. 8, the lenses formed by the liquid crystal layer 3 include a plurality of unit lenses LU, and each unit lens LU includes a plurality of second electrodes 230. The plurality of second electrodes 230 included in each unit lens LU transmit a voltage (e.g., a predetermined voltage) to form the various lenses. When the second electrode 230 is obliquely inclined with respect to the y-axis direction, the unit lens LU also has a shape extending in the direction that is inclined with respect to the y-axis direction.

The plurality of first electrodes 120 may be coupled to each other and may have the common voltage Vcom applied thereto.

Referring to FIG. 9, in the multi-view mode, the lens generated by the liquid crystal layer 3 of the optical system 300 according to an exemplary embodiment of the present invention may be a gradient-index (GRIN) lens, as an example.

Referring to FIG. 10, in the multi-view mode, the lens generated by the liquid crystal layer 3 of the optical system 300 according to an exemplary embodiment of the present invention may be a Fresnel lens. The Fresnel lens is a lens using an optical characteristic of a Fresnel zone plate and may have an effective phase delay which is identical or similar to that of a solid convex lens or the GRIN lens because the refractive index distribution is periodically repeated. A phase modulation type Fresnel zone plates from among the Fresnel zone plates may include a kinoform zone plate, a sinusoidal phase modulation zone plate, a binary phase modulation zone plate, a multi-level phase modulation zone plate, and the like.

FIG. 10 shows the phase delay Y of the unit lens LU when using the kinoform zone plate.

FIG. 11 shows the phase delay Y of the unit lens LU using the multi-level phase modulation zone plate. In the embodiment of the unit lens LU shown in FIG. 11, the effective phase delay is similar to that of the solid convex lens or the GRIN lens, but refractive index or phase delay values are changed (e.g., vary) in a stepwise form. Accordingly, discontinuous points appear to generate diffraction of incident light.

Next, a structure of the optical system 300 and the operation thereof in the multi-view mode according to an exemplary embodiment of the present invention will be described with reference to FIG. 12 as well as FIG. 8.

Referring to FIG. 12, many features of the optical system 300 according to an exemplary embodiment of the present invention are the same or substantially the same as those of the above-described exemplary embodiment. In the present exemplary embodiment, for example, a plurality of second electrodes 230 including a plurality of lower electrode 230a and a plurality of upper electrode 230b disposed at (e.g., on) different layers similar to the exemplary embodiment shown in FIG. 3 or FIG. 5 will be described.

The adjacent ones of the lower electrodes 230a and the upper electrodes 230b may not overlap each other. The width of each of the lower electrodes 230a and each of the upper electrodes 230b in the x-axis direction and/or the interval between the lower electrodes 230a and between the upper electrodes 230b may be constant regardless of their respective position. The number of lower electrodes 230a and upper electrodes 230b included in each Fresnel zone and subzones sZ1, sZ2, sZ3, and sZ4 thereof may be different depending on the position along the optical system 300. Each subzone sZ1, sZ2, sZ3, and sZ4 includes at least one lower electrode 230a and/or one upper electrode 230b, and the number of electrodes 230a and 230b included in each subzone may be gradually reduced closer to an outside from a center of the unit lens LU. The number of lower electrodes 230a and upper electrodes 230b included in adjacent Fresnel zones may be the same.

In the present exemplary embodiment, to realize the Fresnel zone plate, the lower electrodes 230a and the upper electrodes 230b corresponding to the same subzone sZ1, sZ2, sZ3, or sZ4 in each Fresnel zone may have the same voltage applied thereto. Also, the lower electrodes 230a and the upper electrodes 230b of the subzones sZ1, sZ2, sZ3, and sZ4 positioned at the outermost position in each Fresnel zone have a relatively high voltage applied thereto such that the phase delay value of the liquid crystal layer 3 may form a multi-level step shape (e.g., a stepwise shape) as shown in FIG. 12. In this embodiment, the first electrodes 120 may have the common voltage Vcom applied thereto.

Figure 14:
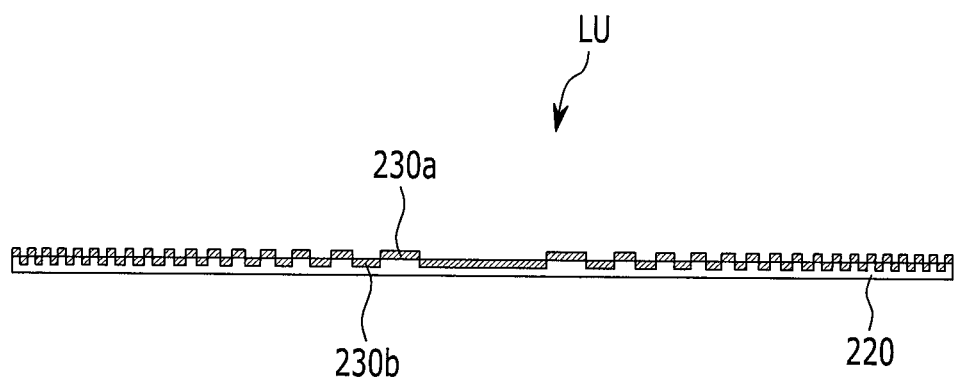
FIG. 14 is a cross-sectional view of the lens unit of the optical system shown in FIG. 13 taken along the line XIV-XIV.

Referring to FIG. 13 and FIG. 14, many features of the optical system 300 according to an exemplary embodiment of the present invention are the same or substantially the same as those of the above-described exemplary embodiment. In the present exemplary embodiment, for example, a plurality of second electrodes 230 including a plurality of lower electrodes 230a and a plurality of upper electrodes 230b disposed at (e.g., in) different layers similar to the exemplary embodiment shown in FIG. 3 or FIG. 5 will be described The lower electrodes 230a and the upper electrodes 230b of the unit lens LU of the optical system 300 according to an exemplary embodiment of the present invention may have widths that are increased closer to the center of the unit lens LU. The width of the respective lower electrode 230a or the upper electrode 230b positioned at (e.g., corresponding to) the center of each unit lens LU may be widest from among the corresponding ones of the lower electrodes 230a or the upper electrodes 230b within the unit lens LU. FIG. 13 shows an example in which one of the upper electrodes 230b is positioned at the center of the unit lens LU.

Figure 15:
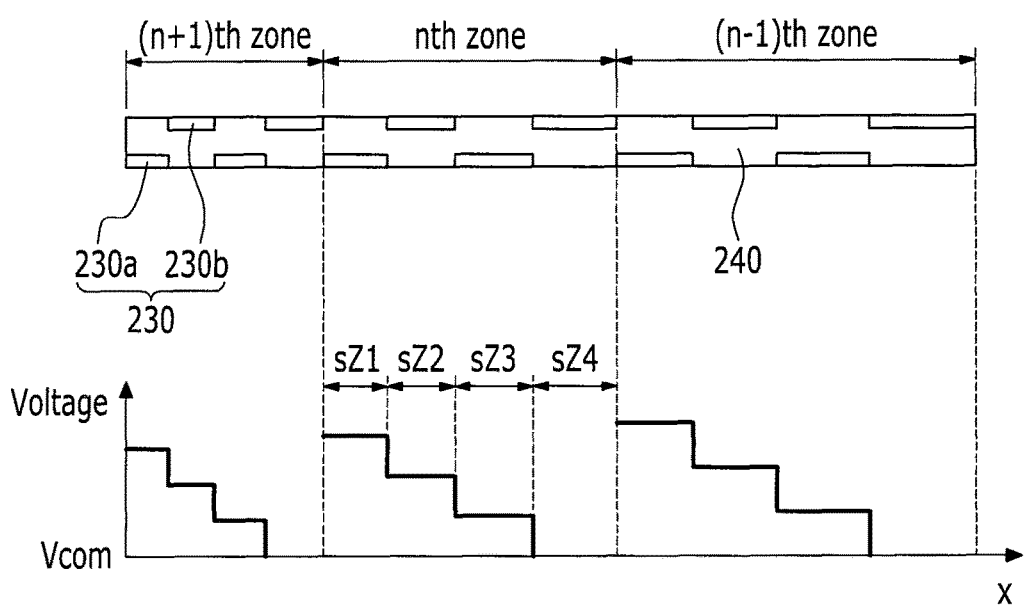
FIG. 15 is a cross-sectional view showing electrodes included in an optical system and a voltage applied thereto according to an exemplary embodiment of the present invention.

Referring to FIG. 15, when the unit lens LU is driven to form the Fresnel lens, for example, the Fresnel lens realizing a multi-level phase modulation zone plate, the lower electrodes 230a and the upper electrodes 230b of each zone may have a step type of voltage applied thereto that is gradually increased (e.g., is greater) from the center of the unit lens LU to the outside. In all zones of the Fresnel lens, the lower electrodes 230a and the upper electrodes 230b positioned in the same subzones sZ1, sZ2, sZ3, and sZ4 may have the same voltage applied thereto.

In this embodiment, the first electrodes 120 may be applied with the common voltage Vcom.

Next, a method in which the display device according to an exemplary embodiment of the present invention is operated in the touch mode while operating in the 2D image display mode will be described with reference to FIG. 16 to FIG. 19 as well as the above-described drawings.

Figure 16:
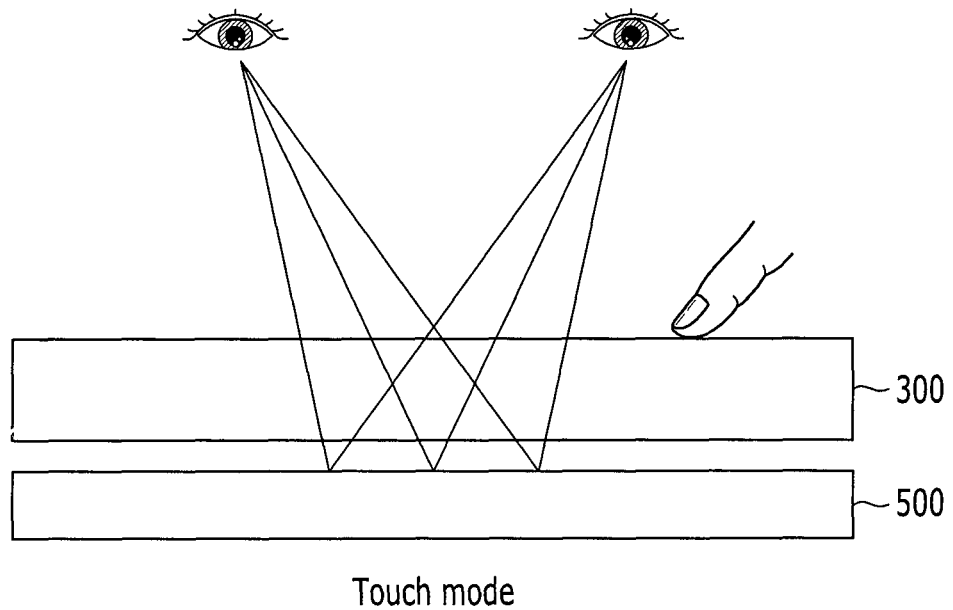
FIG. 16 is a cross-sectional view showing a schematic structure of a display device including an optical system and illustrating a method of displaying a 2D image according to an exemplary embodiment of the present invention.
Figure 17:
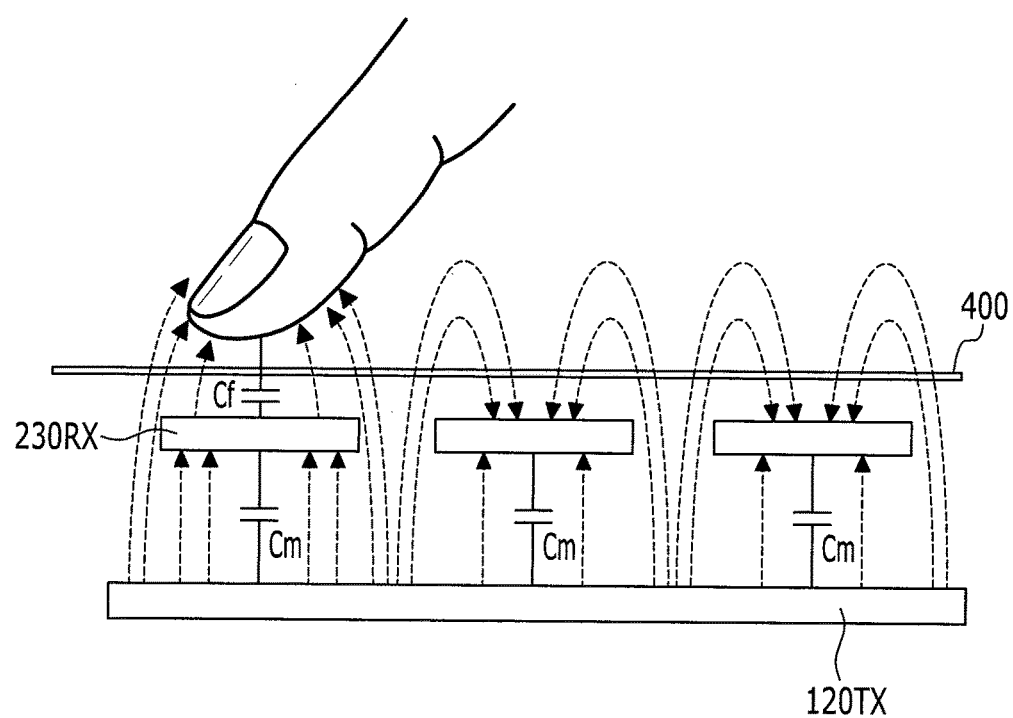
FIG. 17 is a cross-sectional view illustrating a touch sensing method when an optical system according to an exemplary embodiment of the present invention has a touch sensing function.
Figure 18:
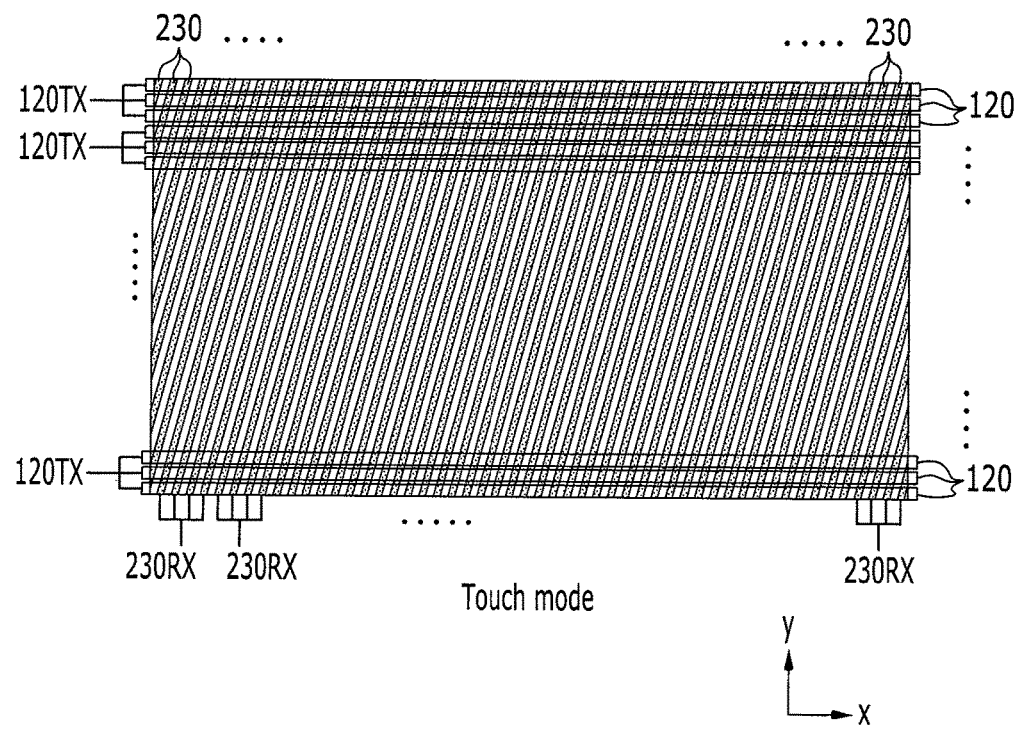
FIG. 18 and FIG. 19 are top plan views of an optical system according to an exemplary embodiment of the present invention.
Figure 19:
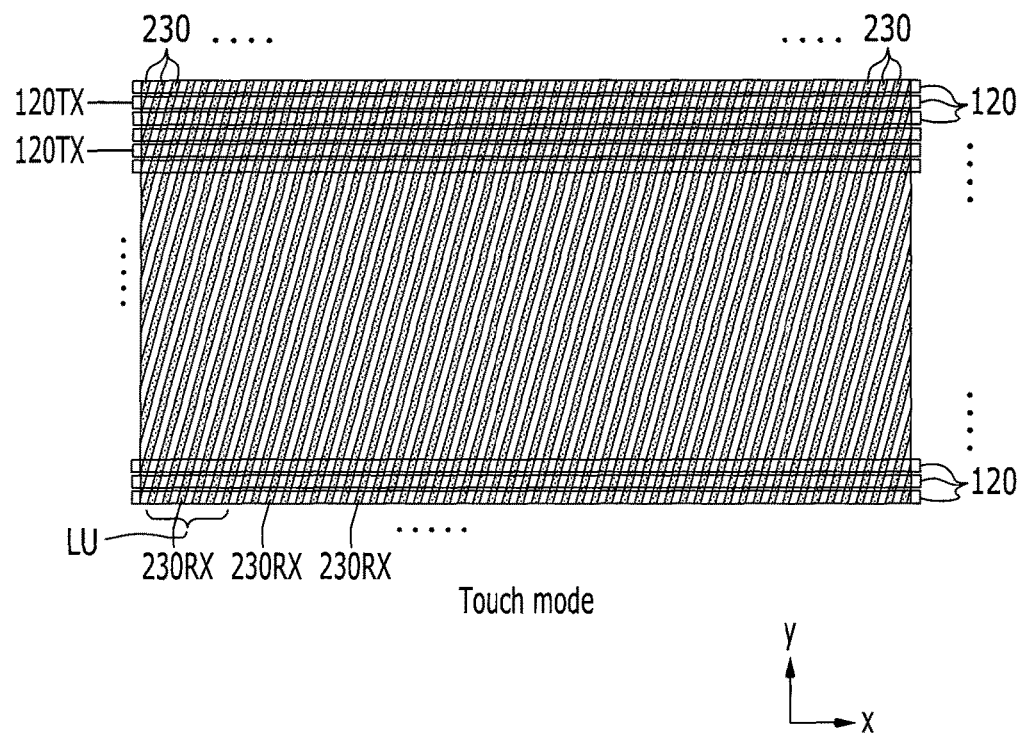

FIG. 16 is a cross-sectional view showing a schematic structure of a display device including an optical system and illustrating a method of displaying a 2D image according to an exemplary embodiment of the present invention, FIG. 17 is a cross-sectional view illustrating a touch sensing method when an optical system according to an exemplary embodiment of the present invention has a touch sensing function, and FIG. 18 and FIG. 19 are top plan views of an optical system according to an exemplary embodiment of the present invention.

Referring to FIG. 16, the display device according to an exemplary embodiment of the present invention includes the display panel 500 and the optical system 300 positioned in (or at) the front thereof.

When the graphics controller 600 outputs the mode selection signal MSEL selecting the touch mode to the optical system controller 350 and the display panel 500, the optical system controller 350, the optical system 300, and the display panel 500 are operated in the touch mode.

The display panel 500 may display the 2D image in the touch mode.

In the touch mode, the optical system 300 passes (e.g., transmits) the image displayed by the display panel 500 without refraction to the viewing point band such that the same image may be observed at all viewing points. That is, the left eye and the right eye of the observer recognize the same image, thus recognizing a 2D image.

Referring to FIG. 17, a first sensing electrode 120TX and a second sensing electrode 230RX that cross each other together form a touch sensing capacitor Cm as a mutual capacitor near crossing points to be a touch sensing node.

When the touch input voltage is transmitted to the first sensing electrode 120TX, the touch sensing capacitor Cm is charged with a charge amount (e.g., a predetermined charge amount), and when a conductor, such as a finger, approaches or contacts from the outside, the conductor and the second sensing electrode 230RX together form a capacitor Cf such that the charge amount of the touch sensing capacitor Cm and the voltage of the second sensing electrode 230RX are changed. The changed charge amount and voltage of the second sensing electrode 230RX are output to and processed by the second driver 330 as the touch output voltage, thereby obtaining the contact information.

One first sensing electrode 120TX may include at least one first electrode 120. Referring to FIG. 18, one first sensing electrode 120TX may be formed by a plurality of adjacent first electrodes 120, and in this embodiment, the plurality of first electrodes 120 forming one first sensing electrode 120TX may be electrically coupled to each other at the edge of the optical panel 310 and/or may have the same signal (e.g., voltage) applied thereto. A number of the first electrodes 120 included in the first sensing electrode 120TX may be determined (e.g., appropriately controlled) according to the touch sensing resolution.

One second sensing electrode 230RX may include at least one second electrode 230. Referring to FIG. 18, one second sensing electrode 230RX may include a plurality of adjacent second electrodes 230, and in this embodiment, the plurality of second electrodes 230 forming one second sensing electrode 230RX may be electrically coupled to each other at the edge of the optical panel 310 and/or may have the same signal (e.g., voltage) applied thereto. The number of second electrodes 230 included in the second sensing electrode 230RX may be determined (e.g., appropriately controlled) according to the touch sensing resolution.

Referring to FIG. 19, each second sensing electrode 230RX may include one second electrode 230 from among the plurality of second electrodes 230 forming the unit lens LU. Likewise, one or more first electrodes 120 may be used as (e.g., may form) each of the first sensing electrodes 120TX.

As described above, the first electrode 120 and the second electrode 230 of the optical system according to an exemplary embodiment of the present invention together form the touch sensing capacitor in the touch mode to sense the external touch and together apply the electric field to the liquid crystal layer 3 in the multi-view mode, such that the thickness and the weight of the optical system and the display device, the number of processing steps, the processing time, the processing cost, and the like may be reduced compared with a conventional art device having both the touch sensing function and the multi-viewing point image display function by separately providing and sequentially adhering the touch panel and the liquid crystal lens panel. Also, by innovatively reducing the number of layers the displayed image passes through, a luminance of the image may not be reduced or substantially reduced.

While this invention has been described in connection with what is presently considered to be practical exemplary embodiments, it is to be understood that the invention is not limited to the disclosed embodiments but is intended to cover various modifications and equivalent arrangements included within the spirit and scope of the appended claims and their equivalents.

DESCRIPTION OF SOME OF THE REFERENCE SYMBOLS

3: liquid crystal layer
31: liquid crystal molecule
50: polarizer
100: lower panel
110, 210: substrate
120: first electrode
130: insulating layer
200: upper panel
230: second electrode
300: optical system
310: optical panel
320, 330: driver
350: optical system controller
400: cover window
500: display panel
510: display area
520: display controller
600: graphics controller
Cm: touch sensing capacitor

What is claimed is:

1. An optical system comprising:
a first panel comprising a plurality of first electrodes extending in a first direction;
a second panel facing the first panel and comprising a plurality of second electrodes extending in a second direction crossing the first direction;
an optical conversion layer between the first panel and the second panel; and
a first insulating layer between the first electrodes and the second electrodes,
wherein, in a touch mode, one or more of the first electrodes and one or more of the second electrodes crossing each other form a touch sensing capacitor configured to sense a touch,
wherein, in a multi-view mode, the first electrodes and the second electrodes are configured to apply an electric field to the optical conversion layer, the electric field depending on a voltage difference between the first electrode and the second electrode, to generate different phase differences according to positions along the optical system, and
wherein the first insulating layer functions as a dielectric material of the touch sensing capacitor and includes an organic material to reduce a capacitance of the touch sensing capacitor for improving sensitivity of the touch sensing capacitor.

2. The optical system of claim 1, wherein a dielectric constant of the first insulating layer is between about 2.5 and about 3.5.

3. The optical system of claim 2, wherein a thickness of the first insulating layer is greater than a thickness of the optical conversion layer.

4. The optical system of claim 3, wherein the first insulating layer is between the first electrodes and the optical conversion layer.

5. The optical system of claim 4, wherein the optical conversion layer comprises a liquid crystal layer.

6. The optical system of claim 1, wherein the optical system further comprises:

a first driver configured to apply a common voltage to the plurality of first electrodes in the multi-view mode and to apply a touch input voltage to the plurality of first electrodes in the touch mode; and a second driver configured to apply different voltages to adjacent ones of the second electrodes in the multi-view mode and to receive a touch output voltage from the second electrode in the touch mode.

7. The optical system of claim 6, wherein, in the touch mode, the plurality of first electrodes are sequentially supplied with the touch input voltage.

8. The optical system of claim 1, further comprising at least one alignment layer disposed on at least one of an inner surface of the first panel and an inner surface of the second panel, respectively.

9. The optical system of claim 1, further comprising:
a cover window on the second panel, and
a polarizer disposed between the cover window and the second electrodes,
wherein the cover window is tempered.

10. The optical system of claim 1, wherein
the second panel comprising a tempered substrate or a polarizer.

11. The optical system of claim 1, wherein the first direction and the second direction form an obtuse angle.

12. A display device comprising:
a display panel;
an optical system over the display panel; and
a graphics controller configured to control the display panel and the optical system,
wherein the optical system comprises:
a first panel comprising a plurality of first electrodes extending in a first direction;
a second panel facing the first panel and comprising a plurality of second electrodes extending in a second direction crossing the first direction;
an optical conversion layer between the first panel and the second panel; and
a first insulating layer between the first electrodes and the second electrodes and substantially completely overlapping or covering the first electrodes or the second electrodes in an area corresponding to a display area of the display panel,
wherein, in a touch mode, one or more of the first electrodes and one or more of the second electrodes crossing each other form a touch sensing capacitor,
wherein, in a multi-view mode, the first electrodes and the second electrodes are configured to apply an electric field to the optical conversion layer, the electric field depending on a voltage difference between the first electrode and the second electrode, to generate different phase differences according to positions along the optical system, and
wherein the first insulating layer functions as a dielectric material of the touch sensing capacitor and includes an organic material to reduce a capacitance of the touch sensing capacitor for improving sensitivity of the touch sensing capacitor.

13. The display device of claim 12, wherein a dielectric constant of the first insulating layer is between about 2.5 and about 3.5.

14. The display device of claim 13, wherein a thickness of the first insulating layer is greater than a thickness of the optical conversion layer.

15. The display device of claim 14, wherein the first insulating layer is between the first electrodes and the optical conversion layer.

16. The display device of claim 12, wherein the optical system further comprising:
a first driver configured to apply a common voltage to the plurality of first electrodes in the multi-view mode and to apply a touch input voltage to the plurality of first electrodes in the touch mode; and
a second driver configured to apply different voltages to adjacent ones of the second electrodes in the multi-view mode and to receive a touch output voltage from the second electrode in the touch mode.

17. The display device of claim 16, wherein, in the touch mode, the plurality of first electrodes are sequentially supplied with the touch input voltage in the touch mode.

18. The display device of claim 12, further comprising a cover window on the second panel,
wherein the cover window is tempered.

19. The display device of claim 12, wherein the second panel further comprising a tempered substrate or a polarizer.

20. The display device of claim 12, further comprising an optical system controller configured to receive a mode selection signal from the graphics controller to control the optical system,
wherein the display panel comprising a display controller configured to receive the mode selection signal from the graphics controller.

* * * * *